US011420355B2

(12) United States Patent
González

(10) Patent No.: US 11,420,355 B2
(45) Date of Patent: Aug. 23, 2022

(54) MULTI-PACK CONTAINER AND MACHINE FOR MANUFACTURING THE SAME

(71) Applicant: INDUSTRIAS TECNOLÓGICAS DE MECANIZACIÓN Y AUTOMATIZACIÓN, S.A., Sant Just Desvern (ES)

(72) Inventor: Manuel González, Sant Just Desvern (ES)

(73) Assignee: INDUSTRIAS TECNOLÓGICAS DE MECANIZACIÓN Y AUTOMATIZACIÓN, S.A., Sant Just Desvern (ES)

( * ) Notice: Subject to any disclaimer, the term of this patent is extended or adjusted under 35 U.S.C. 154(b) by 96 days.

(21) Appl. No.: 16/845,353

(22) Filed: Apr. 10, 2020

(65) Prior Publication Data
US 2020/0324431 A1  Oct. 15, 2020

(30) Foreign Application Priority Data

Apr. 10, 2019  (ES) ................ ES201930324

(51) Int. Cl.
*B26F 1/40*  (2006.01)
*B21D 28/12*  (2006.01)
*B26D 3/08*  (2006.01)
*B26F 1/44*  (2006.01)

(52) U.S. Cl.
CPC ............... *B26F 1/40* (2013.01); *B21D 28/12* (2013.01); *B26D 3/085* (2013.01); *B26F 1/44* (2013.01);

(Continued)

(58) Field of Classification Search
CPC ...... B26F 1/40; B26F 1/44; B26F 2001/4463; B26F 2001/4481; B21D 28/12;
(Continued)

(56) References Cited

U.S. PATENT DOCUMENTS 2,352,339 A * 6/1944 Olney ................. B26F 1/40
83/883
3,465,634 A * 9/1969 Blais ................. B26D 7/1818
83/695

(Continued)

FOREIGN PATENT DOCUMENTS

FR  3022818  1/2016
JP  5938271  * 3/1984

*Primary Examiner* — Jonathan G Riley
(74) *Attorney, Agent, or Firm* — Hodgson Russ LLP

(57) ABSTRACT

The invention relates to a multi-pack container which defines a series of containers (11) formed in a plastic sheet (L) that comprises at least a layer of PET (polyethylene terephthalate), and in which said containers (11) are joined by bridges (12), provided with a pre-cut upper line (13) and a pre-cut lower line (14) for breaking the bridge (12). The pre-cut upper line (13) and a pre-cut lower line (14) are arranged parallel to one another, laterally separated in a horizontal direction and vertically separated to prevent heating by compression and a variation of the properties of the PET layer, allowing for clean breakage of the bridge by rotating the containers with respect to said pre-cut upper and lower lines. The invention also comprises a machine for manufacturing the multi-pack container.

8 Claims, 3 Drawing Sheets

(52) U.S. Cl.
CPC ............... *B26F 2001/4463* (2013.01); *B26F 2001/4481* (2013.01); *B32B 2439/70* (2013.01)

(58) Field of Classification Search
CPC . B26D 3/085; Y10T 225/321; Y10T 83/0341; Y10T 83/0348; B32B 2439/70; B65D 1/30
See application file for complete search history.

(56) References Cited

U.S. PATENT DOCUMENTS

| | | | |
|---|---|---|---|
| 5,409,127 A * | 4/1995 | Stratford | B65D 1/30 220/23.6 |
| 7,549,551 B2 * | 6/2009 | Tyberghein | B65D 1/30 220/23.2 |
| 10,137,591 B2 * | 11/2018 | Bosquet | B26D 3/085 |
| 2007/0095719 A1 * | 5/2007 | Colavito | B31D 5/0021 206/561 |
| 2007/0194495 A1 * | 8/2007 | Henderson | B29C 43/02 264/319 |
| 2010/0163593 A1 * | 7/2010 | Song | G02B 6/25 225/96 |
| 2011/0229705 A1 * | 9/2011 | Georgelos | C08L 23/08 524/502 |
| 2014/0366694 A1 * | 12/2014 | Konieczny | B26F 1/40 83/27 |
| 2021/0154962 A1 * | 5/2021 | González | B31B 50/005 |
| 2021/0179311 A1 * | 6/2021 | Basheer | B65D 81/3294 |

* cited by examiner

MULTI-PACK CONTAINER AND MACHINE FOR MANUFACTURING THE SAME

CROSS-REFERENCE TO RELATED APPLICATION

This application claims priority to Spanish Patent Application No. 201930324, filed on Apr. 10, 2019, the entire disclosure of which is hereby incorporated by reference.

FIELD

This invention is applicable to the field of manufacturing multi-pack containers intended for the food industry and, in particular, to the packaging of food products, such as yogurt, custard, flan or similar.

BACKGROUND

In the manufacture of containers for the food industry, forming multi-pack containers is common by means of a sheet, single-layer or multi-layer, made of plastic material. These multi-pack containers have several individual cavities or containers that are joined by joining bridges defined in the plastic layer itself.

Once they are filled and closed, the containers are subjected to a cutting operation in which one part of the shape of the containers is defined, and a pre-cutting operation, in which pre-cutting lines are defined which affect the joining bridges and which facilitate the subsequent breakage and separation of the different individual containers that make up the multi-pack container.

Typically, the materials used for manufacturing food containers are thermoplastic polymers, although polystyrene (PS) is the most commonly used material in thermoforming manufacturing of containers.

The most popular yogurt and dessert products are currently changing PS (polystyrene) for PET (polyethylene terephthalate), given that it is 100% recyclable and reusable.

However, there is currently no solution for the pre-cutting of bridges between PET containers that allows for a traditional separation of the containers, as is done with PS material, in other words, rotating the containers to be separated in a direction perpendicular to the pre-cutting line.

Some precutting systems have unsuccessfully applied technologies used in precut polystyrene (PS) lines to containers that comprise at least a polyethylene terephthalate (PET) layer, without good quality results, since PET properties force consumers to make the partition by rotating the containers, causing a defective cut, with parts that are poorly cut, in the form of projecting notches, being dangerous to the consumer due to the possibility of them cutting themselves.

In patent FR 3022818 A1, the cutting and precutting operations are performed by a die provided with a lower die, and a punch holder plate which incorporates blades for making the precuts which partially project from said punch holder plate and only make a crease or precut line on the upper face of the container.

Patents US 2014366694 A1 and ES 222926T T3 describe devices for cutting plastic material, provided with facing upper and lower blades for performing precut lines on opposite faces of the material.

The problem of these devices is that during the action of the precut blades, which are facing each other, a flattening of the core of the material to be cut is produced, given that PET is amorphous. This flattening produces an increase in the temperature of the core of the material, causing a change in the molecular structure of the PET material, making it a more elastic material, which increases the classic hinged effect of PET, and thus, in order to break the joining bridges and separate the containers it is necessary to apply rotational movement to the containers in opposite directions, leaving an irregular and dangerous surface for the consumer in the precut area.

The technical problem posed is to develop a multi-pack container, provided with a series of individual containers, formed in a plastic sheet that comprises at least one PET (polyethylene terephthalate) layer, and wherein said containers are joined by joining bridges that have an upper precut line and a lower precut line for the breakage of the bridge and the separation of the containers, and which has suitable features for obtaining clean breakage of the bridges along the precut lines, without defining irregular projections, and performing the same movement that is currently used to separate PS (polystyrene) containers; in other words, rotating the containers with respect to the precut line and without needing to rotate the containers in opposite directions.

This invention also includes a thermoforming machine, of the FFS (Form, Fill & Seal) type or similar, with specific features for manufacturing said multi-pack container.

SUMMARY

This multi-pack container of the invention is formed by a plastic sheet comprising at least one PET (polyethylene terephthalate) layer. Said multi-pack container comprises a series of individual containers joined by joining bridges with a predetermined thickness, defined on the plastic layer itself; said joining bridges comprising an upper precut line and a lower precut line for the breakage of the bridge and separation of the individual containers.

With regard to the upper and lower precut lines, this container has features aimed at solving the problem set forth, providing clean breakage of the joining bridges of the containers formed by a PET sheet or which incorporate at least one PET sheet, by means of the rotation of the containers to be separated in an essentially perpendicular direction to that of said precut lines and without the need to rotate the containers in opposite directions.

To this end, and according to the invention, the upper precut line and the lower precut line are arranged parallel, laterally separated, in a horizontal direction, at a distance comprised between 45% and 55% of the thickness of the bridge; and vertically separated at a distance comprised between 12% and 26% of the thickness of the bridge.

With the indicated separation, the fibres of the PET material have enough space to not be compressed during the forming of the upper and lower precut lines; preventing a flattening and an increase in the temperature of the core of the material, and preventing the molecular structure of the PET material from being modified, making it more elastic; therefore the PET material retains its initial properties and can be easily broken in a uniform way to separate the individual containers along the precut lines, simply by applying a rotational movement to said containers in a perpendicular direction to that of the precut lines.

This solution allows the same results to be obtained in the precutting of PET containers as those obtained with PS material, simply by changing the cutting tool in the thermoforming machine for the containers.

Preferably, given the application of this multi-pack container, the thickness of the material that forms the bridge and in which the upper and lower precut lines are defined is comprised between 0.7 and 1.3 millimetres, which provides the container with a suitable consistency without an excessive size of the thickness of the material.

This invention also includes a machine for manufacturing multi-pack containers, with the aforementioned features, the features of which will be included in the attached claims.

Said machine comprises: a lower die associated with a press with vertical movement; a punch holder plate and a precutting device which comprises an upper precutting blade associated with the punch holder plate and a lower precutting blade associated with the lower die for defining on the joining bridges of the individual containers the upper precut lines and lower precut lines, suitable for breaking said bridges and separating the individual containers formed in PET or which incorporate at least one PET layer.

According to the invention, the upper precut blade and the lower precut blade are parallel to each other and laterally separated, in a horizontal direction, a distance comprised between 0.315 and 0.715 millimetres, this separation being suitable for making the precut lines on the bridges of the multi-pack container without the PET fibres being compressed, the core of the bridge heating up or the physical properties thereof being modified.

Preferably, the upper precutting blade is mounted with the possibility of relative vertical movement with respect to a floating stop which will be provided with limited vertical movement with respect to the punch holder plate; said floating stop being mounted on first calibrated springs and the upper precutting blade on second calibrated springs.

Said calibrated springs provide a sufficient push for the upper precutting blade to penetrate the bridge of the multi-pack container when said multi-pack container is pushed vertically and in an ascending direction, meaning towards the punch holder plate.

Preferably, the relative movement of the upper precutting blade with respect to the floating stop, and the penetration of the upper precutting blade in the plastic material, is comprised between 0.42 and 0.91 millimetres, which is suitable for defining an upper precut line of the depth specified in the previously described container.

In a preferred embodiment, the lower precutting blade projects from the lower die at a distance comprised between 0.098 and 0.234 millimetres, said lower die forming a stop of the penetration of the lower precutting blade in the material forming the bridge of the containers.

DESCRIPTION OF THE FIGURES

As a complement to the description provided herein, and for the purpose of helping to make the characteristics of the invention more readily understandable, the present specification is accompanied by a set of drawings which, by way of illustration and not limitation, represent the following.

DETAILED DESCRIPTION

Figure 1:
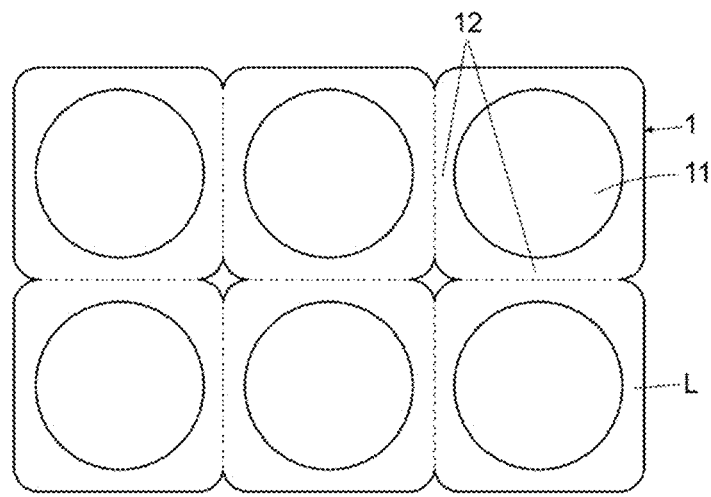
FIG. 1 shows a schematic plan view of a multi-pack container, according to the invention, formed in PET.
Figure 2:
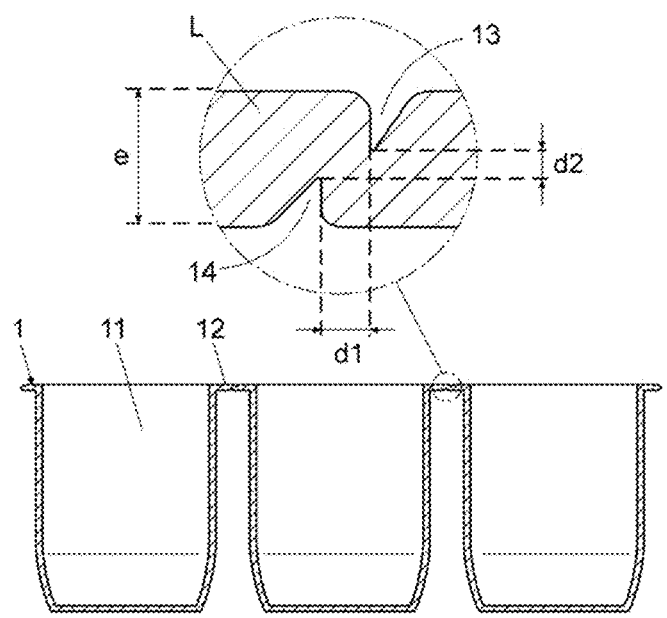
FIG. 2 shows an elevation view of the multi-pack container of the preceding figure, in a vertical plane cross section, and an enlarged detail view of an area of the bridge wherein one can see the arrangement of the upper and lower precut lines.

In the embodiment shown in FIGS. 1 and 2 one can see a multi-pack container (1) according to the invention, formed from a plastic sheet (L) which, in this case, is made up of a layer of PET (polyethylene terephthalate).

This multi-pack container (1) comprises a series of individual containers (11) joined to each other by bridges (12) with a predetermined thickness (e) and formed by the PET sheet (L) itself.

In this specific example the thickness (e) of the bridge is comprised between 0.7 and 1.3 millimetres.

As can be seen in the enlarged detail of FIG. 2, the bridge (12) comprises an upper precut line (13) and a lower precut line (14) arranged parallel, laterally separated, in a horizontal direction, at a distance (d1) comprised between 45% and 55% of the thickness (e) of the bridge, and vertically separated a distance (d2) comprised between 12% and 26% of the thickness of the bridge (12).

In a specific embodiment, the thickness of the material that forms the bridge (12) is 1 millimetre, and the upper and lower precut lines (13, 14) are horizontally separated a distance (d1) of 0.5 millimetres and vertically separated a distance (d2) of 0.19 millimetres.

Figure 3:
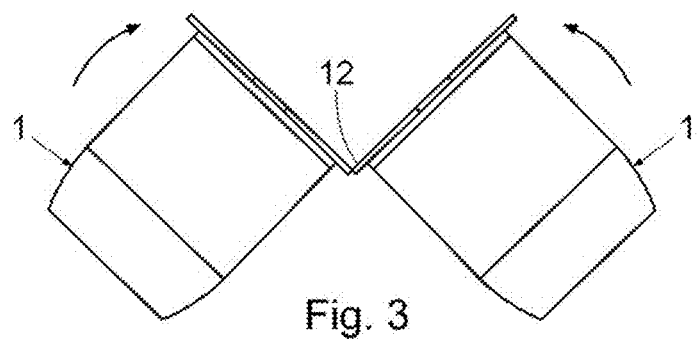
FIG. 3 shows an elevation view of two individual containers of the multi-pack PET container of the preceding figures and the rotational movement to be applied to the same, in a direction perpendicular to the precut lines, to achieve the breakage of the bridge and the separation of said individual containers.

With the indicated features, the compression of the material for defining the precut lines prevents the heating of the PET fibres in the core area and the modification of the physical properties thereof, thereby allowing the PET material to maintain the properties thereof and achieving clean breakage of the multi-pack container (1) on said precut lines, simply by rotating the containers (11) in a perpendicular direction to that of the precut lines, as shown in FIG. 3, as if it were a polystyrene (PS) container.

Figure 4A:
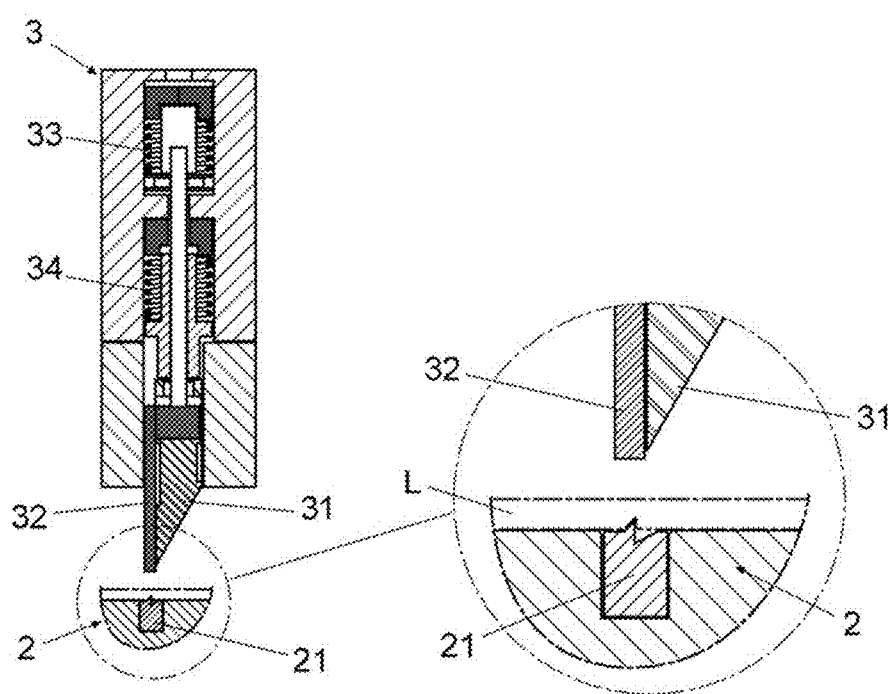
FIGS. 4a, 4b and 4c show partial elevation views, of a vertical plane cross section of the machine for manufacturing the multi-pack container of FIGS. 1 to 3, and enlarged views of the respective details, in which one can see the precutting device in three different and successive positions during the making of the upper and lower precut lines.
Figure 4B:
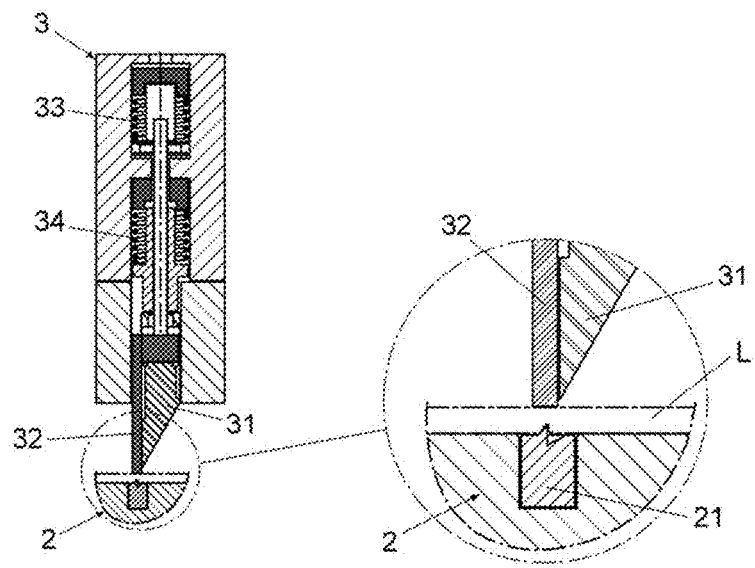
Figure 4C:
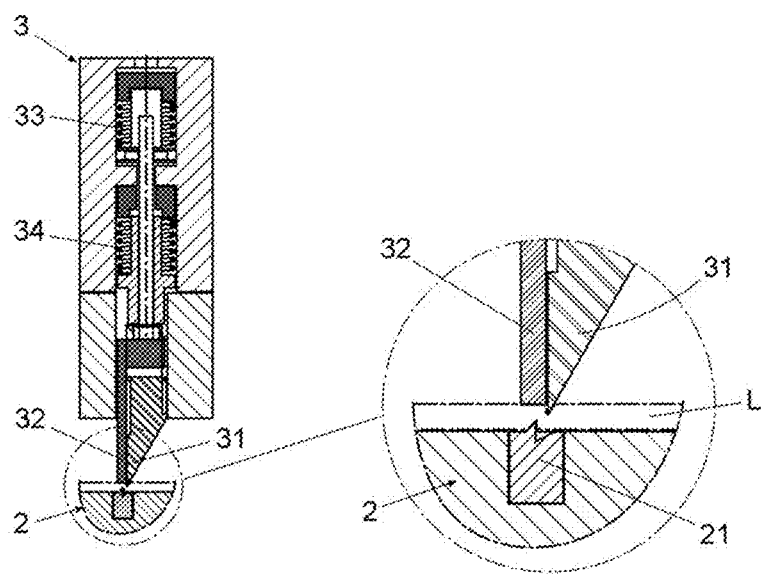

FIGS. 4a-4c partially show a thermoforming machine suitable for manufacturing the previously described multi-pack container, provided with precutting device for the bridge of the containers.

Said machine is of the type that comprises: a lower die (2) associated with a press with vertical movement (not shown); a punch holder plate (3) and a precutting device which comprises: an upper precutting blade (31) associated with the punch holder plate (3) and a lower precutting blade (21) associated with the lower die (2), for defining on the joining bridges (12) of the containers (11) the upper precut lines and lower precut lines (13, 14), suitable for breaking said bridges (12) and separating the individual containers (11).

According to the invention, the upper precutting blade (31) and the lower precutting blade (21) are parallel and laterally separated, in a horizontal direction, at a distance comprised between 0.315 and 0.715 millimetres, which allows the upper and lower precut lines (13, 14) to be defined in the bridge (12) of the multi-pack container (1) with a horizontal separation comprised between 45% and 55% of the thickness (e) of the bridge (12).

The upper precut blade (31) is mounted with possible vertical movement with respect to a floating stop (32), with the possibility of limited vertical movement with respect to the punch holder plate (3).

Said floating stop (32) is mounted on first calibrated springs (33) and the upper precutting blade (31) on second calibrated springs (34).

The relative movement of the upper precutting blade (31) with respect to the floating stop (32) and the penetration of said upper precutting blade (31) in the plastic material is comprised between 0.42 and 0.91 millimetres.

In turn, the lower precutting blade (21) projects from the lower die (2) at a distance comprised between 0.098 and 0.234 millimetres, said lower die (2) forming a stop of the penetration of the lower precutting blade (21) on the material forming the bridge (12) of the containers (11).

The upper precutting blade (31) and the lower precutting blade (21) have first parallel and vertical faces, and second oblique faces, divergent in opposite directions, moving away from the other opposite precutting blade. This configuration minimises the pressure exerted by the blades on the PET fibres in the area comprised between both blades.

The functioning of the aforementioned cutting device, represented in FIGS. 4a-4c, is the following:

The lower die (2) acts by means of a ram (not referenced) against the material to produce the cut of the lower precutting blade (21) and the subsequent movement of the upper precutting blade (31).

The upper precutting blade (31) moves to the degree allowed for by the floating stop (32), thereby achieving exact proportions for different cutting percentages proposed and with the particularity in that all of the blades that intervene in a device of these features are individual and have the same behaviour, given that it is the thickness of the material that limits the precuts by means of the ram of the lower die (2) and of the floating stop (32).

To obtain the results described, an actuation system has been developed, which ensures that each and every one of the multi precut elements are exactly the same in the making thereof, regardless of the flatness of the machine system and of the tolerance in the thickness of the material.

The lower die (2) and the lower precutting blade (21) are vertically moved by the movement of the machine press, lifting the PET sheet (L) against the floating stop (32), which is held in position by means of first calibrated springs (33) to withstand the necessary cutting force so that the lower precutting blade (21) penetrates the material, making the lower precut line (14). By the upwards movement of the cutting press, the floating stop (32) is vertically moved, compressing the first calibrated springs (33) and moving them upwards a suitable distance for the indicated penetration of the upper precutting blade (31) in the material of the sheet (L) and for defining the upper precut line (13).

The upper precutting blade (31) is also mounted on second calibrated springs (34) which allow the simultaneous movement of the upper precutting blade (31) and the floating stop (32) to absorb the planar tolerances of the system, ensuring an equal precutting in the entire device.

Having sufficiently described the nature of the invention, in addition to a preferred exemplary embodiment, it is hereby stated for the relevant purposes that the materials, shape, size and layout of the described elements may be modified, provided that it does not imply altering the essential characteristics of the invention claimed below.

The invention claimed is:

1. A multi-pack container, comprising:
a series of containers formed in a plastic sheet that comprises at least one polyethylene terephthalate layer, and wherein said containers are joined by bridges with a predetermined thickness, defined on the plastic sheet itself; said bridges comprising an upper partial precut line and a lower partial precut line for the breakage of the bridge and the separation of the containers;
wherein the upper partial precut line and the lower partial precut line are arranged parallel, laterally separated, in a horizontal direction, at a distance comprised between 45% and 55% of the thickness of the bridge; and vertically separated a distance comprised between 12% and 26% of the thickness of the bridge.

2. The multi-pack container according to claim 1, wherein the thickness of the material of the bridge is comprised between 0.7 and 1.3 millimetres.

3. A machine for manufacturing a multi-pack container according to claim 1, comprising:
a lower die associated with a press with vertical movement; a punch holder plate and a precutting device which comprises an upper precutting blade associated with the punch holder plate and a lower precutting blade associated with the lower die, for defining on the joining bridges of the containers an upper partial precut line and lower partial precut line, suitable for breaking said bridges and separating the containers; wherein the upper and lower precutting blades are parallel and laterally separated, in a horizontal direction, at a distance comprised between 0.315 and 0.715 millimetres.

4. The machine according to claim 3, wherein the upper precutting blade is vertically movable with respect to a floating stop provided with limited vertical movement with respect to the punch holder plate; said floating stop being mounted on first calibrated springs and the upper precutting blade on second calibrated springs.

5. The machine according to claim 4, wherein the relative movement of the upper precutting blade with respect to the floating stop and the penetration of the upper precutting blade in the plastic material is comprised between 0.42 and 0.91 millimetres.

6. The machine according to claim 3, wherein the lower precutting blade projects from the lower die a distance comprised between 0.098 and 0.234 millimetres, said lower die forming a stop of the penetration of the lower precutting blade in the material forming the bridge of the containers.

7. The machine according to claim 3, wherein the upper precutting blade and the lower precutting blade have first parallel and vertical faces, and second oblique faces, divergent in opposite directions, moving away from the opposite precutting blade.

8. The multi-pack container of claim 1, wherein an opening of the container is defined by a perimeter edge of the plastic sheet.

* * * * *